United States Patent
Aust

(10) Patent No.: US 8,096,339 B2
(45) Date of Patent: Jan. 17, 2012

(54) ULTRASONIC WELDING TOOL WITH FLUID DRIVE

(75) Inventor: Volker Aust, Birkenfeld (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 499 days.

(21) Appl. No.: 12/383,504

(22) Filed: Mar. 25, 2009

(65) Prior Publication Data

US 2009/0250170 A1 Oct. 8, 2009

(30) Foreign Application Priority Data

Mar. 27, 2008 (DE) .......................... 10 2008 015 851

(51) Int. Cl.
*B32B 37/00* (2006.01)

(52) U.S. Cl. ...................... 156/580.1; 156/351; 156/358; 156/378

(58) Field of Classification Search ............... 156/64, 156/73.1, 351, 358, 378, 580.1, 580.2; 425/174.2; 264/442, 443, 444, 445; 228/1.1, 110.1; 700/301; 310/323.01, 323.18
See application file for complete search history.

(56) References Cited

U.S. PATENT DOCUMENTS

| 4,995,938 A | * | 2/1991 | Tsutsumi | 156/580.1 |
| 5,863,383 A | * | 1/1999 | Bussey | 156/530 |
| 6,491,785 B1 | * | 12/2002 | Sato et al. | 156/379.6 |

FOREIGN PATENT DOCUMENTS

| DE | 3524414 A1 | 10/1986 |
| DE | 19861021 A1 | 4/2000 |
| DE | 10138026 A1 | 3/2003 |
| DE | 102005034846 A1 | 2/2007 |

* cited by examiner

Primary Examiner — James Sells
(74) Attorney, Agent, or Firm — Michael L. Dunn

(57) ABSTRACT

An ultrasonic welding tool with fluid drive, wherein the ultrasonic welding tool (2) is connected by way of a piston rod (3) to a working piston (5) which is guided in a housing (4) of the drive, wherein the working piston (5) sub-divides the drive housing (4) into a primary chamber (6) and a secondary chamber (7), wherein each of the chambers is able to communicate by way of a valve (16) with a fluidized pressure source, wherein at least one sensor (18, 19) is provided for detecting a physical property of the fluid drive which sensor emits an actual signal which is in relationship with the physical property detected and which via a control circuit controls the two valves in such a way that the physical property detected follows a reference value profile.

15 Claims, 3 Drawing Sheets

ULTRASONIC WELDING TOOL WITH FLUID DRIVE

BACKGROUND OF THE INVENTION

This application claims priority from German Application 102008015851.8, filed Mar. 27, 2008.

The present invention relates to a fluid-driven ultrasonic welding tool, wherein the ultrasonic welding tool is connected by way of a piston rod to a working piston which is guided in a housing of the drive, wherein the working piston sub-divides the drive housing into a primary chamber and a secondary chamber, wherein each of the chambers is able to communicate by way of a valve with a fluidized pressure source.

In this context, the term, "valve" means any device which is able to optionally connect or separate the chamber in question to or from the fluidized pressure source. Clearly, said function of the two valves can also be realized by one single control valve, by means of which it is possible to optionally connect either the primary chamber or secondary chamber to the fluidized pressure source. The term, "fluid" can refer to both gases and liquids.

Fluid-driven ultrasonic welding tools of this kind are known. Usually, the valve connecting to the primary chamber is opened in order to allow the ultrasonic welding tool to move. As a result, the primary chamber communicates with a pressurized air source, and so the pressure in the primary chamber rises suddenly. Since the secondary chamber communicates with ambient pressure at the same time, the working piston moves so that the ultrasonic welding tool is moved.

The ultrasonic welding tool generally has what is known as a sonotrode by means of which ultrasonic fluctuations are transmitted into the material which is to be processed. The ultrasound is produced by a converter acted upon by high-frequency alternating voltage, and that converter may possibly be connected to the sonotrode by means of an amplitude transformer.

In order to move the sonotrode away from the material for processing after the welding has been done, the primary chamber is separated from the pressurized air source and communicates with ambient pressure. As soon as only ambient pressure is present in the primary chamber the pressure in the secondary chamber is greater than in the primary chamber, and so the working piston is set in motion, the primary chamber becomes smaller in size, and the secondary chamber becomes larger in size.

This mode of operation has the drawback that only the desired working pressure, i.e. the pressure which the sonotrode exerts upon the material to be processed, can be set. There is virtually no way of influencing the actual course of movement of the sonotrode.

Furthermore, the secondary chamber is sometimes subject to a counter-pressure, in order to allow various different tools to be operated. However, the nominal pressure in the secondary chamber cannot be adjusted easily. Therefore, the amount of compressed air which is introduced into the secondary chamber at the start of the welding process has to be adjusted accordingly.

Also, the direction of forward movement of the sonotrode is generally in the vertical direction, and so the inherent weight of the sonotrode likewise has an impact upon the working piston. An exchange of the ultrasonic working tool or sonotrode, which can be associated with a change in weight of the tool, therefore means that the counter-pressure in the secondary chamber has to be reset. During the welding process, i.e. whilst the ultrasonic welding tool is moving, the counter-pressure in the secondary chamber must, however, be kept constant.

Since, for some applications, it is advantageous if the lowering speed of the working piston can be set in order to achieve an optimum weld result, the proposal has already been made to drive the ultrasonic welding tool by means of a servo motor. Here, a motor drives a spindle which is connected to the ultrasonic welding tool. The servo motor has the advantage that every pattern of movement of the sonotrode can theoretically be preset by the servo motor. Therefore, often, a position sensor is additionally provided for determining the position of the sonotrode (or of the working piston which is connected to the sonotrode), so that the movement of the sonotrode can be controlled.

However, as a result of external factors, such as, for example, a variation in the thickness of the material to be processed, a change in working pressure can occur, and thus a change in the force to be applied, and this is not detected by the servo motor drive, thereby adversely affecting the weld result.

Even if a force sensor were to be provided as an alternative to, or in addition to, the positions sensor, control by means of a servo motor would find difficulty in counteracting sudden changes of pressure.

BRIEF SUMMARY OF THE INVENTION

On the basis of the afore-described prior art, the aim of the present invention is therefore to make available an ultrasonic welding tool with drive, which permits highly accurate movement control and which can also respond directly to sudden fluctuations of force and/or pressure.

According to the invention, this is solved in that for detecting a physical property of the fluid drive at least one sensor is provided which emits an actual signal which is in relationship with the physical property detected and which via a control circuit controls the two valves in such a way that the physical property detected follows a reference value profile.

In a particular embodiment, the invention is an ultrasonic welding tool with a fluid drive. The ultrasonic welding tool is connected by way of a piston rod to a working piston which is guided in a housing of the drive. The working piston subdivides the drive housing into a primary chamber and a secondary chamber. Each of the chambers is able to communicate by way of a valve with a fluidized pressure source, wherein at least one sensor is provided for detecting a physical property of the fluid drive which sensor emits an actual signal which is in relationship with the physical property detected and which via a control circuit controls the two valves in such a way that the physical property detected follows a reference value profile.

The physical property detected could, for example, be the pressure in the primary chamber or the pressure in the secondary chamber. If, for example, the physical property detected is the pressure in the primary chamber, then the working pressure can be adjusted by the controlled opening and closing of both valves. As already mentioned, the operation of both valves can also be realized by a 3-, 4- or multiway valve, or by a control valve. Therefore, both valves could therefore be replaced by the kind of valve which permits separate connection and separation of the primary- and/or secondary chamber in relation to the fluidized pressure source.

The fluid pressure which is used also results in the creation of a "passive control" which is able to respond very rapidly to sudden fluctuations of pressure and/or force. If, for example, due to a fluctuation in thickness of the material to be processed, the force with which the sonotrode meets the material to be machined increases suddenly, then the working piston can avoid the force, and move inside the drive's housing.

DETAILED DESCRIPTION OF THE INVENTION

Figure 1:
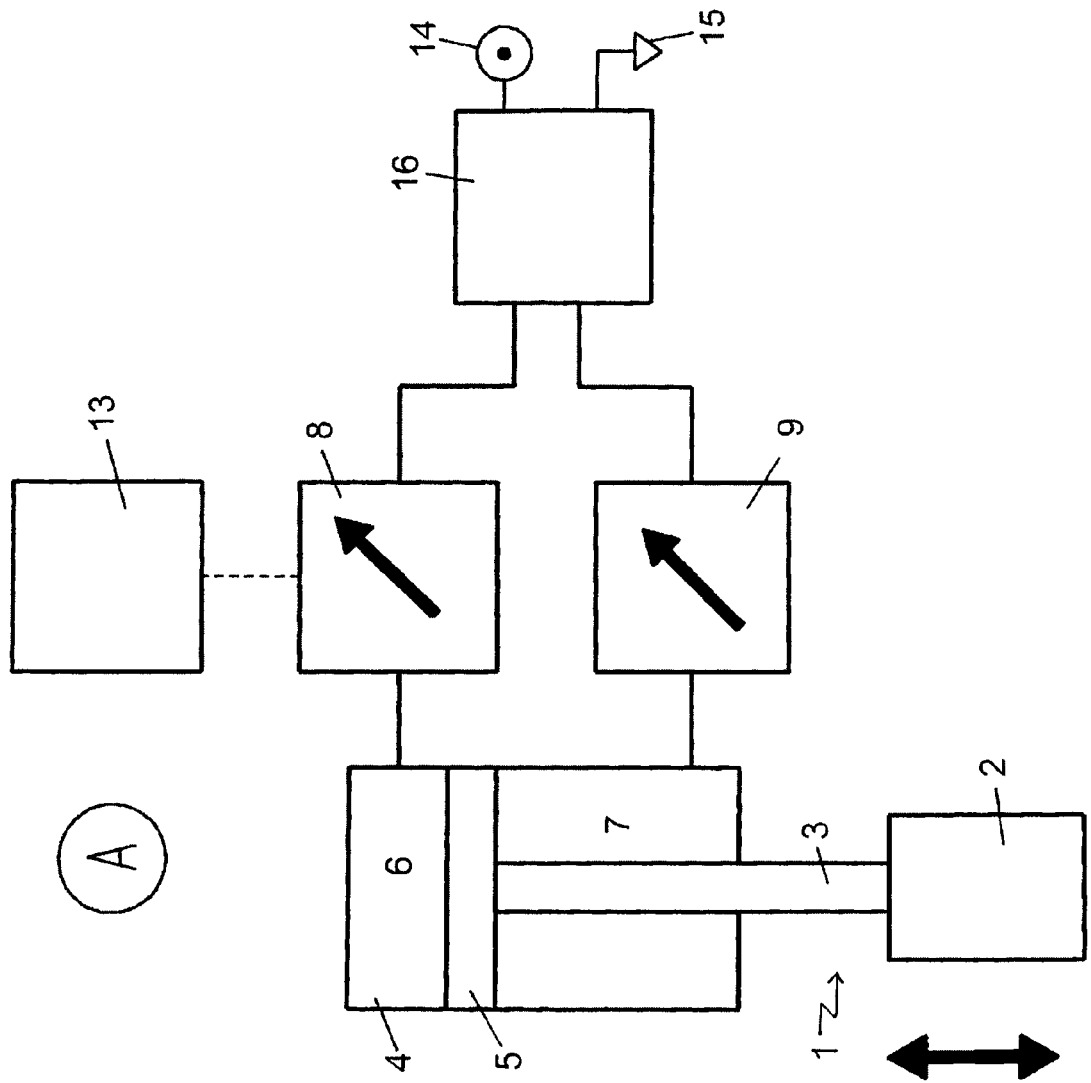
FIG. 1 is a diagrammatic representation of a prior art ultrasonic welding tool driven by means of a fluid drive

In one particularly preferred embodiment it is provided that the physical property detected is the ratio of the pressure in the primary chamber and the pressure in the secondary chamber.

In another particularly preferred embodiment it is provided that the physical property detected is the difference between the pressure in the primary chamber and the pressure in the secondary chamber.

Furthermore, for some applications, it can be advantageous if the physical property detected is the speed of the working piston. Alternatively, the physical property detected can be the position of the working piston.

In one particularly preferred embodiment, provided for the purpose of detecting two physical properties are two sensors, each of which emits an actual signal which is in relationship with the respectively detected physical property, wherein the first actual signal controls the two valves by way of a control circuit in such a way that the first physical property detected follows a reference value profile if the first signal is smaller than, or equal to, a given threshold value, and the second actual signal controls the two valves by way of a control circuit in such a way that the second physical property detected follows a reference value profile if the first signal is greater than the given threshold value.

Particularly if the course of movement of the ultrasonic welding device is composed of a plurality of phases, e.g. lowering movement for moving the sonotrode towards the material to be processed, welding movement while the sonotrode is in contact with the material being processed, and lifting movement for lifting the sonotrode away from the material again after welding, this feature can serve to control the course of movement differently for the individual phases.

Thus, for example, the position of the working piston can be detected, and for as long as the sonotrode is far enough away from the material to be processed, the position of the working piston can be controlled. As soon as the position sensor indicates that the sonotrode is approaching the material to be processed, the pressure difference between the primary chamber and secondary chamber can be regulated.

Alternatively, it can be provided that for the purpose of detecting two physical properties two sensors are provided, each of which emits an actual signal which is in relationship with the respectively detected physical property, wherein the first actual signal controls the two valves by way of a control circuit in such a way that the first physical property detected follows a reference value profile if the second signal is smaller than, or equal to, a given threshold value, and the second actual signal controls the two valves by way of a control circuit in such a way that the second physical property detected follows a reference value profile when the second signal is greater than the given threshold value.

By way of example, the pressure difference between the secondary chamber and primary chamber can be detected, and the position of the working piston be controlled, for as long as said difference does not exceed a given value. As soon as the detected pressure difference rises above a given value, then the pressure difference between the primary chamber and secondary chamber can be regulated.

It is particularly preferable if the first physical property is the position of the working piston, and if the second physical property is the pressure difference or the pressure ratio between the pressure of the primary chamber and the pressure of the secondary chamber.

Further advantages, features and possible applications of the present invention will become clear from the following description of a preferred embodiment and associated drawings, wherein:

FIG. 1 shows an ultrasonic welding tool 1. The ultrasonic welding tool 1 has a sonotrode 2 which is connected by way of a piston rod 3 to a working piston 5 guided in a housing 4 of the drive, wherein the working piston 5 sub-divides the drive housing 4 into a primary chamber 6 and a secondary chamber 7. The primary chamber 6 is connected by way of a first pressure regulator 8 to a valve 16, which, in turn, optionally communicates the primary chamber 6 with either a fluidized pressure source 14 or ambient pressure. A control 13 effects the opening and closing of the pressure regulator 8. In other words, the control 13 and pressure regulator 8 together form a pressure control means for the pressure in the primary chamber 6. Therein, the primary chamber can communicate optionally either with the pressurized air source 14 or with ambient pressure 15.

The secondary chamber 7 communicates optionally by way of a second pressure regulator 9 with either a fluidized pressure source 14 for producing a counter-pressure in the secondary chamber 7, or with ambient pressure.

Before this prior art embodiment can be operated, the secondary chamber 7 must first of all be supplied with pressurized air via the valve 16. The pressure in the secondary chamber 7 must be so selected that it is at least enough so that when the primary chamber 6 is acted upon by ambient pressure the working piston 5 will move upwards, i.e. away from the material being processed, counter to the force of weight which is defined by the inherent weight of the working piston 5, the push rod 3 and the sonotrode 2.

In order to move the sonotrode downwards, towards the material to be processed (not shown), or upwards, i.e. away from the material being processed, the control 13 adjusts the pressure regulator 8, so that a suitable pressure builds up in the primary chamber 6. As soon as the pressure in the primary chamber 6 exceeds the pressure in the secondary chamber 7, the working piston 5 moves downwards, thereby causing the sonotrode to move towards the material to be machined.

As soon as the welding process has ended, the valve 16 is reversed, and the primary chamber 6 is aerated, i.e. communicates with the ambient air. This results in the working piston once again moving upwards, since the pressure in the secondary chamber 7 is now greater than the pressure in the primary chamber 6.

Figure 2:
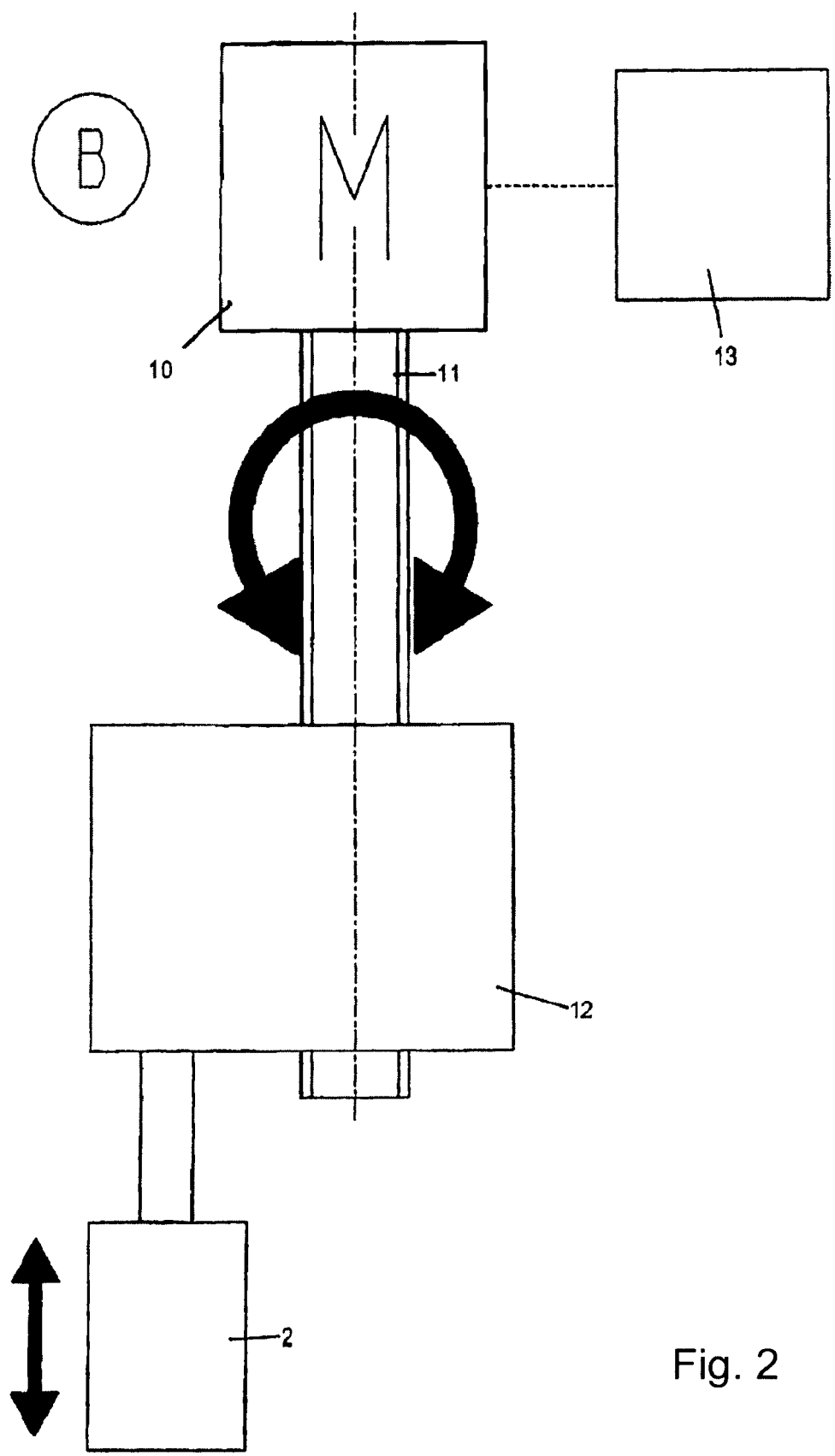
FIG. 2 is a diagrammatic representation of a prior art ultrasonic welding tool with servo motor.

FIG. 2 shows diagrammatically an alternative embodiment which is likewise known from the prior art. In this embodiment, a control 13 acts upon a motor 10 which is connected to a spindle 11. The spindle 11 drives the support 12 of the sonotrode 2. The control 13 causes the motor 10 to rotate the spindle 11 in order to move the sonotrode forwards and/or backwards.

Figure 3:
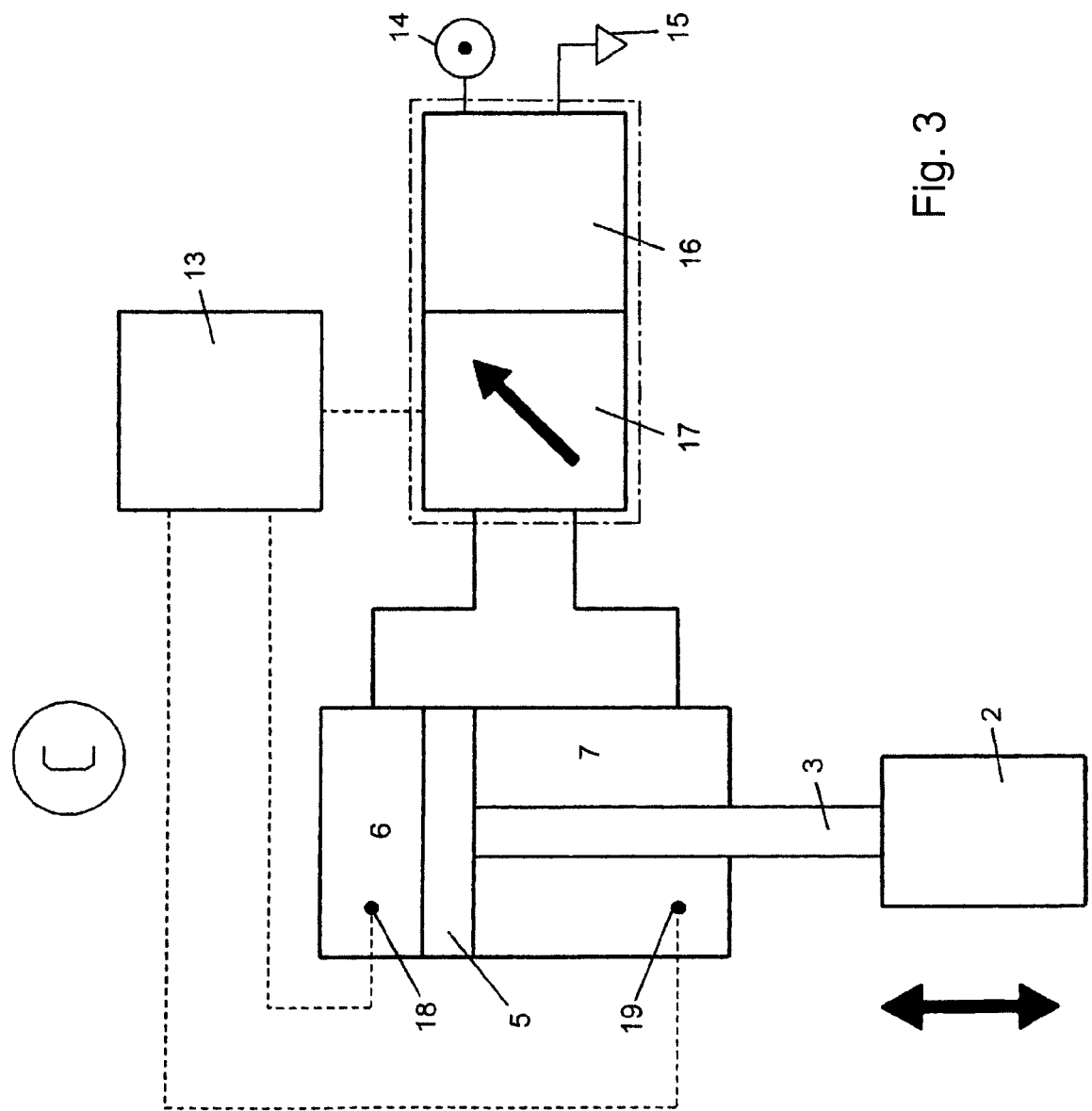
FIG. 3 is a preferred embodiment of the present invention.

FIG. 3 shows a particularly preferred embodiment of the present invention. Here, the sonotrode 2—like in the prior art embodiment of FIG. 1—is connected to a working piston 5 by way of a push rod 3, the working piston sub-dividing the drive housing 4 into a primary chamber 6 and a secondary chamber 7.

By virtue of the pressure regulator 17, by way of which both the primary chamber 6 and the secondary chamber 7 are able to communicate with the pressurized air source 14 or the ambient pressure 15, and which is controlled by the control 13, it is possible to regulate the difference in pressure between the primary chamber 6 and the secondary chamber 7. To that end, the sensors 18, 19 are used to detect the pressure in the primary and secondary chambers 6, 7.

Both the pressure regulator 17 shown and the valve 16 are multiway components which could also be realized by a plurality of separate members. Thus, the primary chamber 6 could communicate by way of a first pressure regulator and a first valve with the pressurized air source 14 or ambient pressure 15, whilst the secondary chamber 7 could communicate by way of a second pressure regulator and a second valve with the pressurized air source 14 or the ambient pressure 15. In the embodiment shown, both the first and second pressure regulators and the first and second valves have been replaced by corresponding combination members. Clearly, both variants fall within the scope of protection.

The embodiment according to the invention combines the advantages of the known pneumatic and electromechanical drive systems. The pneumatic control permits highly accurate movement of the sonotrode. In this respect, the speed and/or position of the sonotrode, or of the drive piston, can be regulated, for example.

Contrary to the known control by means of a servo motor, in the embodiment according to the invention there is no forced course of movement of the welding tools, since, owing to the pneumatic mounting, if there are unexpected fluctuations of force, e.g. a counter-force in the welding process due to fluctuations in the thickness of the material, the system will demonstrate a sufficiently "gentle" behaviour in order to equalize and compensate for the fluctuations of force. In the event of sudden impulses, the pneumatic system is therefore able to act resiliently and attenuate the system.

Furthermore, the pneumatic cylinder which is used has better smooth running properties than the spindle/nut-component of the servo drive.

In a preferred embodiment, the instantaneous pressure is measured directly in the primary chamber and secondary chamber of the pneumatic cylinder, and is used as the control variable. Contrary to the known servo drive, no indirect physical variable is used (e.g. the current consumption of an electric motor), in order to derive the applied force.

It is also possible to divide the course of movement into various phases, so that rapid lowering of the sonotrode and a correspondingly more accurate movement can ensue when the sonotrode makes contact with the material to be processed. By appropriate switch-over, or parallel operation, of position, speed and force adjustments an optimum casting and joining behaviour is achievable in reproducible manner throughout the welding process.

Furthermore, the entire system stroke can be divided into feed stroke and working stroke. Therein, the feed stroke can take place at maximum speed (maximum acceleration), whilst the working stroke takes place with the greatest possible accuracy and at a speed which is specific to the process.

This is made possible without being dependent on the concept of a mechanical component (e.g. spindle pitch, prestressing and degree of accuracy of a mechanical spindle).

LIST OF REFERENCE NUMERALS

1 Ultrasonic Welding Tool
2 Sonotrode, or Resonant Unit
3 Piston Rod
4 Drive Housing
5 Working Piston
6 Primary Chamber
7 Secondary Chamber
8 Pressure Regulator
9 Pressure Regulator
10 Motor
11 Spindle
12 Support
13 Control
14 Pressurized Air Source
15 Ambient Pressure
16 Valve
17 Valve
18 Sensor
19 Sensor

What is claimed is:

1. An ultrasonic welding tool with fluid drive, wherein the ultrasonic welding tool (2) is connected by way of a piston rod (3) to a working piston (5) which is guided in a housing (4) of the drive, wherein the working piston (5) sub-divides the drive housing (4) into a primary chamber (6) and a secondary chamber (7), wherein each of the chambers is able to communicate by way of a valve (16) with a fluidized pressure source, wherein at least one sensor (18, 19) is provided for detecting a physical property of the fluid drive which sensor emits an actual signal which is in relationship with the physical property detected and which via a control circuit controls the two valves in such a way that the physical property detected follows a reference value profile.

2. An ultrasonic welding tool according to claim 1, wherein the physical property detected is pressure in the primary chamber or pressure in the secondary chamber.

3. An ultrasonic welding device according to claim 1 the physical property detected is a ratio of pressure in the primary chamber to pressure in the secondary chamber.

4. An ultrasonic welding device according to claim 1 wherein the physical property detected is the difference between pressure in the primary chamber and pressure in the secondary chamber.

5. An ultrasonic welding device according to claim 1 wherein the physical property detected is speed of the working piston.

6. An ultrasonic welding device according to claim 1 wherein the physical property detected is position of the working piston.

7. An ultrasonic welding device according to claim 1 wherein the physical property detected is force which the ultrasonic welding tool exerts upon a material to be processed.

8. An ultrasonic welding device according to claim 1 wherein first and second sensors are provided for the purpose of detecting two physical properties each sensor emitting first and second signals respectively which relates to first and second detected physical properties, wherein the first actual signal controls the two valves by way of a control circuit in such a way that the first physical property detected follows a reference value profile if the first signal is smaller than, or equal to, a given threshold value, and the second actual signal controls the two valves by way of a control circuit in such a way that the second physical property detected follows a reference value profile if the first signal is greater than the given threshold value.

9. An ultrasonic welding device according to claim 1 wherein first and second sensors are provided for the purpose of detecting two physical properties each sensor emitting first and second signals respectively which relates to first and second detected physical properties, wherein the first actual signal controls the two valves by way of a control circuit in such a way that the first physical property detected follows a reference value profile if the second signal is smaller than, or equal to, a given threshold value, and the second actual signal controls the two valves by way of a control circuit in such a way that the second physical property detected follows a reference value profile if the second signal is greater than the given threshold value.

10. An ultrasonic welding device according to claim 8 wherein the first physical property is the position of the working piston.

11. An ultrasonic welding device according to claim 9 wherein the first physical property is the position of the working piston.

12. An ultrasonic welding device according to claim 8 wherein the second physical property is pressure difference or pressure ratio between pressure of the primary chamber and pressure of the secondary chamber.

13. An ultrasonic welding device according to claim 9 wherein the second physical property is pressure difference or pressure ratio between pressure of the primary chamber and pressure of the secondary chamber.

14. An ultrasonic welding device according to claim 10 wherein the second physical property is pressure difference or pressure ratio between pressure of the primary chamber and pressure of the secondary chamber.

15. An ultrasonic welding device according to claim 11 wherein the second physical property is pressure difference or pressure ratio between pressure of the primary chamber and pressure of the secondary chamber.

* * * * *